(12) United States Patent
Kusterer et al.

(10) Patent No.: US 8,898,300 B2
(45) Date of Patent: Nov. 25, 2014

(54) SYSTEMS AND METHODS FOR COLLECTING AND STORING NETWORK TRAFFIC DATA

(71) Applicant: Verisign, Inc., Reston, VA (US)

(72) Inventors: Stephen Kusterer, Leesburg, VA (US); John Rodriguez, Capitola, CA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 13/952,142

(22) Filed: Jul. 26, 2013

(65) Prior Publication Data

US 2013/0311655 A1    Nov. 21, 2013

Related U.S. Application Data

(63) Continuation of application No. 13/077,344, filed on Mar. 31, 2011, now Pat. No. 8,504,656.

(51) Int. Cl.
*G06F 15/16* (2006.01)
*H04L 12/26* (2006.01)
*H04L 29/06* (2006.01)

(52) U.S. Cl.
CPC ............... *H04L 43/08* (2013.01); *H04L 43/18* (2013.01); *H04L 69/22* (2013.01); *H04L 43/0876* (2013.01); *H04L 43/04* (2013.01)
USPC ............................ 709/224; 370/252; 370/253

(58) Field of Classification Search
CPC ...... H04L 43/04; H04L 43/0876; H04L 69/22
USPC ........... 709/200–203, 217–227; 370/252, 253
See application file for complete search history.

(56) References Cited

U.S. PATENT DOCUMENTS

| | | | |
|---|---|---|---|
| 6,418,467 B1 | 7/2002 | Schweitzer et al. | |
| 7,606,802 B2 | 10/2009 | Gebhart et al. | |
| 8,004,998 B2* | 8/2011 | Levy et al. | 370/250 |
| 8,135,979 B2 | 3/2012 | Kenigsberg et al. | |
| 8,762,515 B2* | 6/2014 | Knapp et al. | 709/224 |
| 2007/0283194 A1 | 12/2007 | Villella et al. | |
| 2007/0300296 A1 | 12/2007 | Kudla et al. | |
| 2009/0013007 A1 | 1/2009 | Caner | |
| 2010/0023545 A1 | 1/2010 | Gladkov et al. | |
| 2010/0034362 A1 | 2/2010 | Phelps et al. | |
| 2010/0050084 A1* | 2/2010 | Knapp et al. | 715/736 |
| 2010/0050256 A1* | 2/2010 | Knapp et al. | 726/22 |

(Continued)

OTHER PUBLICATIONS

International Search Report and Written Opinion mailed May 22, 2012, for International Application No. PCT/US2012/031386.

*Primary Examiner* — Moustafa M Meky
(74) *Attorney, Agent, or Firm* — MH2 Technology Law Group, LLP

(57) ABSTRACT

Systems and methods are disclosed for collecting network traffic logs at a plurality of network sites, such as DNS name servers and network routers, and transmitting data extracted from the network traffic logs to a central repository. In one implementation, a system includes a processor and a memory. The memory stores instructions that cause the processor to retrieve PCAP files from a plurality of servers and extract data from the PCAP files. The data comprises header data and digest data. The processor stores the header data and the digest data in a header/digest pair. In another aspect, the processor retrieves a sample of the PCAP files from each of the plurality of servers rather than retrieving all PCAP files.

20 Claims, 4 Drawing Sheets

(56) References Cited

U.S. PATENT DOCUMENTS

| | | | |
|---|---|---|---|
| 2010/0050262 A1* | 2/2010 | Knapp et al. | 726/25 |
| 2011/0125749 A1* | 5/2011 | Wood et al. | 707/737 |
| 2011/0149727 A1 | 6/2011 | Yoon et al. | |
| 2012/0084605 A1 | 4/2012 | Shilon et al. | |
| 2012/0158723 A1 | 6/2012 | Wu et al. | |
| 2012/0174224 A1 | 7/2012 | Thomas et al. | |

\* cited by examiner

SYSTEMS AND METHODS FOR COLLECTING AND STORING NETWORK TRAFFIC DATA

CROSS-REFERENCE TO RELATED APPLICATION

The present Application for Patent is a continuation of and claims the benefit of U.S. patent application Ser. No. 13/077,344, filed Mar. 31, 2011, entitled "Systems and Methods for Collecting and Storing Network Traffic Data," which was allowed Apr. 10, 2013, and assigned or under obligation of assignment to the same entity as this Application and which is hereby expressly incorporated by reference in its entirety.

FIELD

This disclosure is generally directed to systems and methods for collecting and storing data about internet traffic and, more particularly, to systems and methods for collecting and extracting data from DNS resolution sites for storage and processing at a central server.

BACKGROUND

Communication over the Internet begins with a request from a client browser for information located at a specified domain. For example, an Internet user on a client computer may type "www.acme-co.com/products" in a web browser, which is a request for the information located at an address corresponding to www.acme-co.com. Such a request is known as a DNS request, and is routed to name servers (DNS servers) for translation into the Internet Protocol (IP) address corresponding to the domain. For example, the name server may translate www.acme-co.com into the IP address 122.304.22.1. After translating the request into an IP address, the name server provides the address to the client and the client may retrieve the desired information.

Because of the volume of DNS packet requests that name servers must process each day, many different and geographically diverse name servers exist to handle the DNS packet requests. Each name server, also known as an edge site, may have a network recorder to passively analyze and record the network traffic and log this information into files written to a storage medium. One example of this recorded information is a packet capture (PCAP) file. The PCAP files recorded at a name server location are generally kept at the location. Because the PCAP files are large, not indexed, and geographically isolated, the data recorded in the PCAP files is not easily accessible for analysis.

In addition to DNS packet requests, a network recorder may capture other types of network traffic, such as NetFlow™ records and HTTP, POP, and SMTP requests. This information may also be stored in PCAP files or some other type of log file. Like the information in the DNS logs, this information may also be geographically isolated and not easily accessible for analysis.

Therefore, it is desirable to introduce tools to allow name server owners to collect and process this information in a central repository so that trends can be analyzed and statistical models created.

SUMMARY

The system of the present invention reads PCAP files and extracts data from them. The data may be extracted at the edge site where it was recorded and the edge site may then send the extracted data to a central processing location. Alternatively, the edge site may send the PCAP files to the central processing location, and the central processing location may then extract the data. The data in the PCAP files may be accessed with existing tools and then extracted, so that data in certain fields is saved and data in other fields is discarded. Once the data is extracted, it may be stored as a header/digest class pair. The header class acts as a key and contains the same information regardless of the type of digest. This way, each type of digest (DNS, NetFlow™, HTTP, etc.) has an associated header that shares fields common to each of the other types of digests.

Consistent with disclosed embodiments, a computer-implemented method is provided for collecting network traffic data. The method includes obtaining, by a network site remote from a central repository, one or more PCAP files and extracting, by the network site, data from the one or more PCAP files. The data may include header data and digest data. The method may further include storing, by the network site, the header data and the digest data in a header/digest pair and transmitting the header/digest pair to the central repository.

Consistent with other disclosed embodiments, a system is provided for collecting network traffic data. The system may comprise a processor at a network site remote from a central repository and a memory coupled to the processor. The memory may store instructions to direct the processor to perform operations. The operations performed by the process may include obtaining, by the network site, one or more PCAP files and extracting, by the network site, data from the one or more PCAP files. The data may include header data and digest data. The processor may further perform the operation of storing, by the network site, the header data and the digest data in a header/digest pair and transmitting the header/digest pair to the central repository.

Consistent with other disclosed embodiments, computer-readable media, such as storage devices, may store program instructions that are executable by one or more processors to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments provide methods and systems for collecting network traffic data from various geographic locations for storage in a central repository. Collecting the data in a central repository frees the edge sites, such as DNS name servers, that handle DNS requests from processing related to analysis requests. Requiring a DNS name server to handle analysis requests leads to degradation in DNS request processing times because of the resources required to address the analysis requests. Furthermore, using a central repository isolates DNS sites from changes caused by new analysis requirements, so that no new software needs to be pushed to DNS sites to handle new analysis requirements. Collection also enables analysis across geographically diverse sites. Such analysis may include detecting distributed denial of service attacks, detecting drops in packet traffic, and analyzing loads across sites to allow optimal allocation of resources.

Reference will now be made in detail to exemplary embodiments, examples of which are illustrated in the accompanying drawings. Wherever convenient, the same reference numbers will be used throughout the drawings to refer to the same or like parts.

Figure 1:
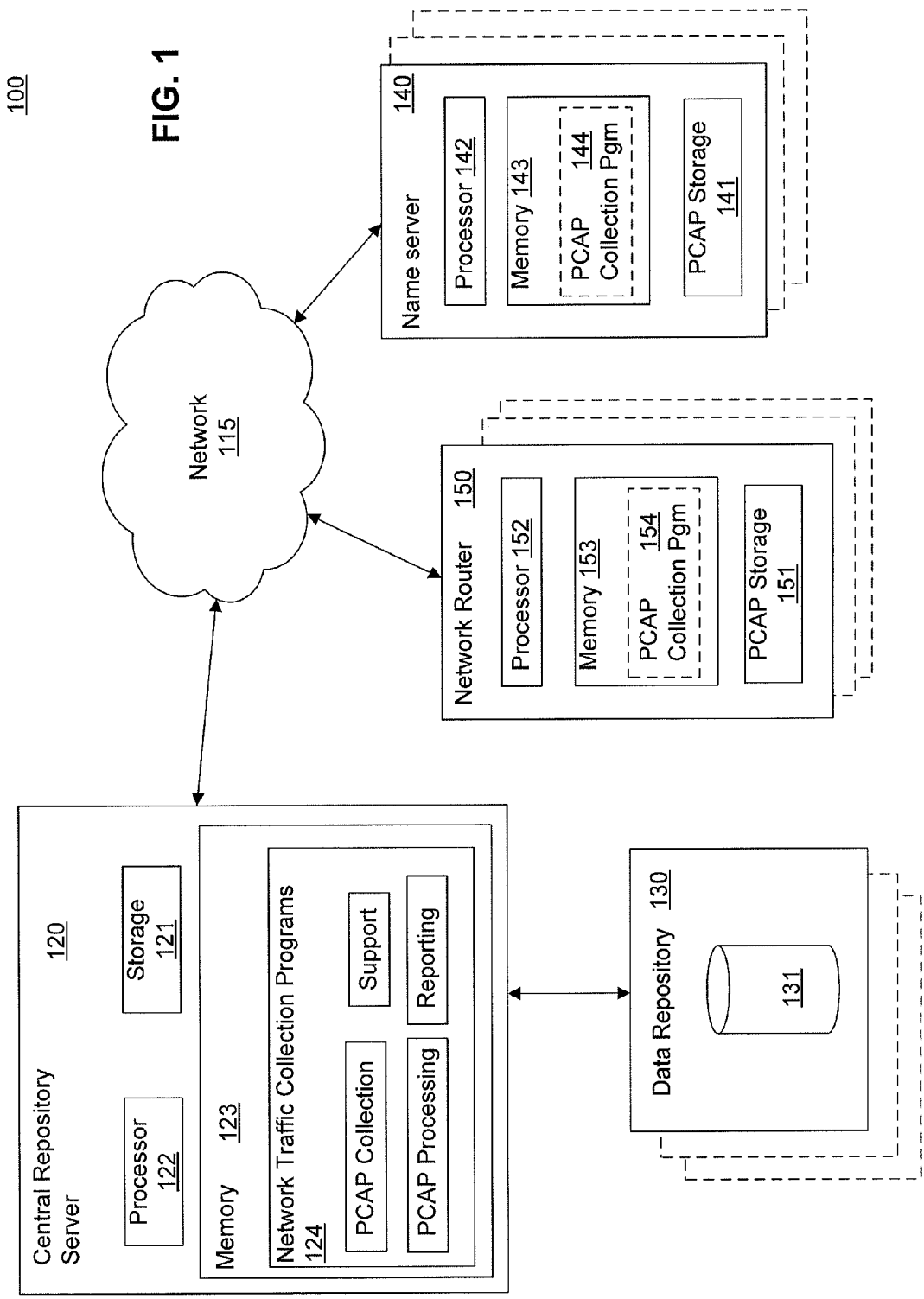
FIG. 1 is a diagram illustrating an exemplary network traffic collection system that may be used to implement disclosed embodiments.

FIG. 1 is a diagram illustrating an exemplary network traffic collection system 100 that may be used to implement disclosed embodiments, including exemplary system components. The components and arrangement, however, may be varied. Central repository server 120 may include a processor 122, a memory 123, input/output (I/O) devices (not shown), and storage 121. Central repository server 120 may be implemented in various ways. For example, central repository server 120 may be a general purpose computer, a server, a mainframe computer, or any combination of these components. Central repository server 120 may communicate over a link with network 115. For example, the link may be a direct communication link, a LAN, a WAN, or other suitable connection. Network 115 may include the Internet. Central repository server 120 may be standalone or it may be part of a subsystem, which may, in turn, be part of a larger system, such as a legacy name server system.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In one embodiment, memory 123 may include one or more network traffic collection programs or subprograms 124 loaded from storage 121 or elsewhere that, when executed by central repository server 120, perform various procedures, operations, or processes consistent with disclosed embodiments. For example, memory 123 may include a network traffic collection program that goes to various edge sites and imports log files from each site; a network traffic processing program that reads the log files to extract data, formats the extracted data into header/digest pairs and stores the header/digest pairs in a database or other data repository; a reporting program that performs analysis on the stored data and processes queries for the stored data; and an integrative support program that links the other programs and allows them to use a common database, provides a common user interface, performs basic bookkeeping tasks, (such as deleting the network traffic files after the data has been extracted), and provides user guidance and help. Memory 123 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with a network traffic collection program 124 that performs several functions when executed by processor 122. For example, memory 123 may include a single program 124 that performs the functions of the network traffic collection system, or program 124 could comprise multiple programs. Moreover, processor 122 may execute one or more programs located remotely from central repository server 120. For example, central repository server 120 may access one or more remote programs that, when executed, perform functions related to disclosed embodiments.

Memory 123 may be also be configured with an operating system (not shown) that performs several functions well known in the art when executed by central repository server 120. By way of example, the operating system may be Microsoft Windows™, Unix™, Linux™, Solaris™, or some other operating system. The choice of operating system, and even to the use of an operating system, is not critical to any embodiment.

Central repository server 120 may include one or more I/O devices (not shown) that allow data to be received and/or transmitted by central repository server 120. I/O devices may also include one or more digital and/or analog communication input/output devices that allow central repository server 120 to communicate with other machines and devices, such as name server 140, network router 150, or client computers (not shown). Client computers may provide requests from users representing queries of the data stored in storage 121 or data repository 130. Central repository server 120 may receive data from external machines and devices and output data to external machines and devices via I/O devices. The configuration and number of input and/or output devices incorporated in I/O devices may vary as appropriate for certain embodiments.

Central repository server 120 may also be communicatively connected to one or more data repositories 130, e.g., through network 115. Data repository 130 may include one or more files or databases 131 that store information and are accessed and/or managed through central repository server 120. By way of example, the databases may be Oracle™ databases, Sybase™ databases, other relational databases, or non-relational databases, such as Hadoop sequence files, HBase or Cassandra. The databases or other files may include, for example, data and information related to the source and destination of a network request, the data contained in the request, etc. In some embodiments, the databases or other files may include data similar to the items shown in FIG. 4. Systems and methods of disclosed embodiments, however, are not limited to separate databases.

Central repository server 120 may be communicatively connected to one or more name servers 140 through network 115. In some embodiments, name server 140 may be owned or operated by a root name server operator. Name server 140 may process DNS packet requests and store information about the requests in a PCAP log file. Name server 140 may include a processor 142, a storage 141, and a memory 143. Storage 141 may be a volatile or non-volatile, magnetic, semiconductor, tape, optical, removable, nonremovable, or other type of storage device or computer-readable medium and may store the PCAP log files. In some disclosed embodiments, memory 143 may include one or more collection programs or subprograms 144 loaded from storage 141 or elsewhere that, when executed by name server 140, read and extract data from the PCAP log files and send the extracted data to central repository server 120. Alternatively, programs 144 may include a program that allows central repository server 120 to retrieve PCAP log files stored at name server 140.

Central repository server 120 may also be communicatively connected to one or more network routers 150 through network 115. Network router 150 may include a processor 152, a memory 153, and a storage 151. In some disclosed embodiments, memory 153 may include one or more collection programs or subprograms 154 loaded from storage 151 or elsewhere that, when executed by network router 150, read and extract data from the PCAP log files and send the extracted data to central repository server 120. Alternatively, programs 154 may include a program that allows central repository server 120 to retrieve PCAP log files stored at network router 150. Network router 150 may also be communicatively connected to name server 140 through network 115 or one or more or client computers (not shown). Client computers may provide requests from users to network router 150, name server 140, or central repository server 120. Network router 150 may collect IP traffic information using a NetFlow™ protocol and create PCAP log files from this information.

Figure 2:
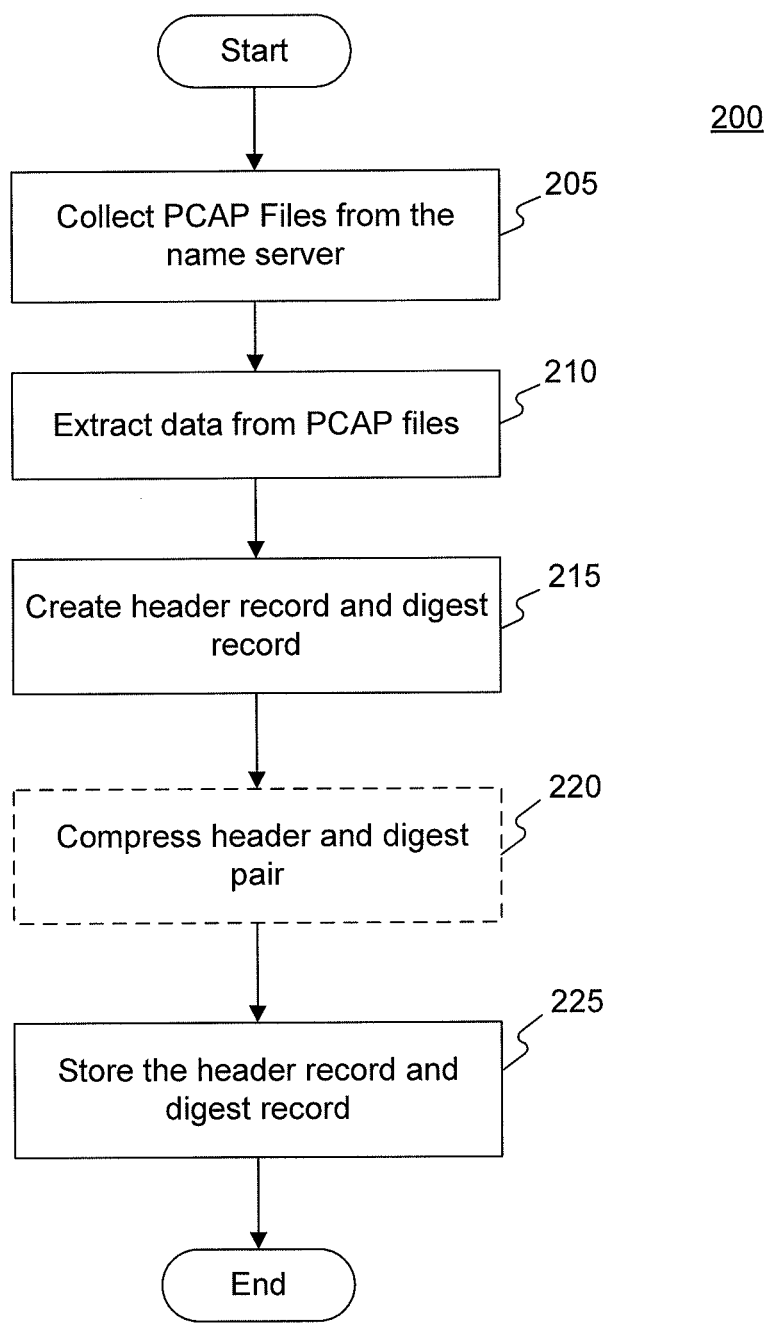
FIG. 2 is a flow diagram illustrating an exemplary process for collecting network traffic data, consistent with disclosed embodiments.

FIG. 2 is flow diagram illustrating exemplary processes for collecting network traffic data, consistent with disclosed embodiments. Process 200 is a high level view of how central repository server 120 may collect and process network traffic log files from remote sites, such as name servers 140 and network routers 150. In certain embodiments, process 200 may be implemented according to network collection programs 124.

In Step 205 of FIG. 2, central repository server 120 may obtain PCAP files from one of name servers 140. In other embodiments, central repository server 120 may obtain the PCAP files from network router 150. The PCAP files may contain, e.g., data from DNS request logs or NetFlow™ logs. Central repository server 120 may use one of several methods to obtain the PCAP files. Central repository server 120 may collect a sample of PCAP files from each of several name servers. For example, central repository server 120 may collect the first five PCAP files for each hour, every one-hundredth PCAP file for each hour, or a random group of PCAP files for each hour. Central repository server 120 may obtain these files periodically, for example, once per hour, twice a day, or once per day. In other embodiments, central repository server 120 may periodically collect all PCAP files from a name server that have not already been collected.

After collecting the PCAP files then, in Step 210, central repository server 120 may extract data from the files. Central repository server 120 may use existing utilities to read the PCAP files to reconstruct, for example, a single DNS request. Once central repository server 120 constructs a single DNS request from the PCAP files, central repository server 120 may extract certain data fields from the request and format the extracted data into a header/digest pair, as shown in Step 215. Storing the data in a header/digest pair allows data to be grouped for faster access to like data. The data stored in the header may be common to all types of network traffic. The data stored in the digest may be unique to the particular type of network traffic, such as a DNS request, a NetFlow™ record, an HTTP request, or other network protocol request. Each digest would have an associated header. In other embodiments, the header/digest pair may be stored in a single record, with the header information stored towards the beginning of the record. In some embodiments the header/digest pair may be stored as a Hadoop sequence file.

In some embodiments, central repository server 120 may optionally compress the header/digest pair before storage, as shown in Step 220. Then, in Step 225, central repository server 120 stores the header/digest pair, for example, in data repository 130. Once stored in data repository 130, central repository server 120 may make the data available to processes that query and analyze the stored data. The stored data represents network traffic from a plurality of edge sites.

Figure 3:
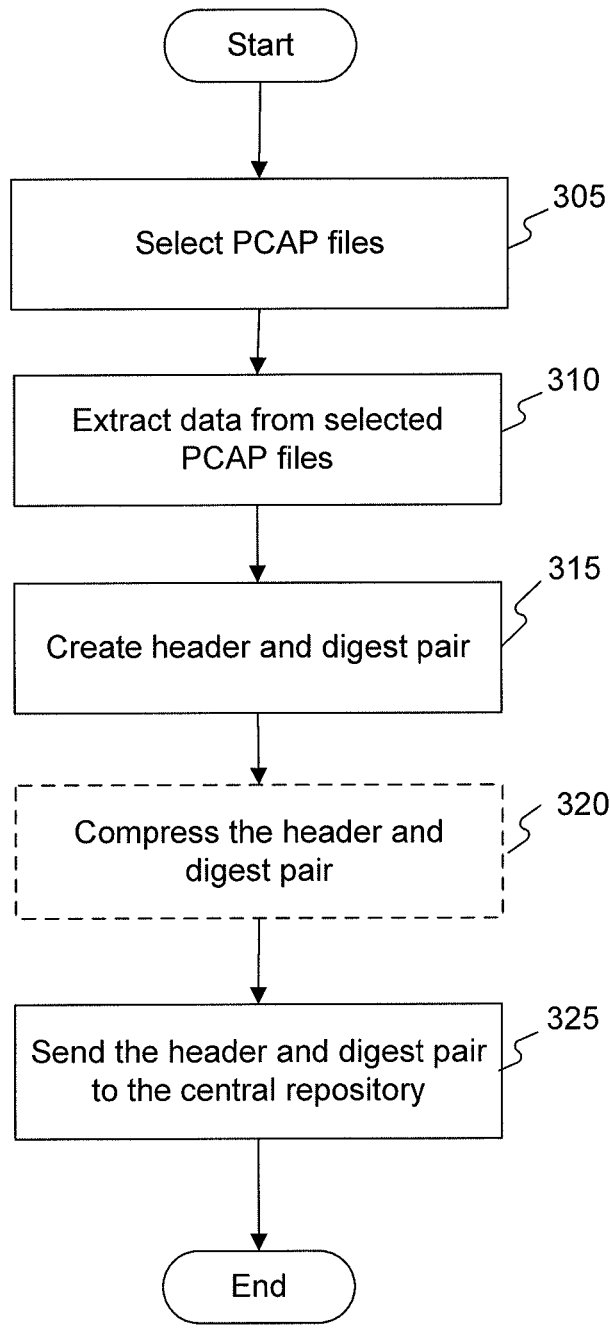
FIG. 3 is a flow diagram illustrating another exemplary process for collecting network traffic data, consistent with disclosed embodiments.

FIG. 3 is flow diagram illustrating an alternative exemplary processes for collecting network traffic data, consistent with disclosed embodiments. Process 300 is a high level view of how a remote site, such as name server 140, may process network traffic log files, which are then transferred to central repository server 120. In certain embodiments, process 300 may be implemented according to network collection programs 144 in memory 143.

In Step 305 of FIG. 3, name server 140 may select PCAP files for extraction. Similar to Step 205 of FIG. 2, name server 140 may use one of several methods to obtain the PCAP files, ranging from extracting a periodic sample of PCAP files to extracting all PCAP files. Next, in Step 310, name server 140 may extract data from the files. Name server 140 may use existing utilities to read the PCAP files to reconstruct, for example, a single DNS request. From the single DNS request, name server 140 may extract certain data fields and format the extracted data into a header/digest pair, as shown in Step 315, and, in Step 320, may optionally compress the header/digest pair. Then, in Step 325, name server 140 may send the header/digest pair to central repository server 120. In other embodiments, name server 140 may store the header/digest pairs until central repository server 120 makes a request for the data. The advantage of process 300 is that central repository server 120 needs to import less data, which requires less time and resources for the transfer.

In some embodiments, central repository 120 may use a combination of processes 200 and 300 to collect the network traffic data. For example, some edge sites, such as name servers 140, may have less network traffic, so having to transfer entire PCAP files from the sites may not appreciably burden central repository server 120. However, for edge sites with heavy traffic, extraction at the edge site may result in faster data transfer times to central repository server 120.

Figure 4:
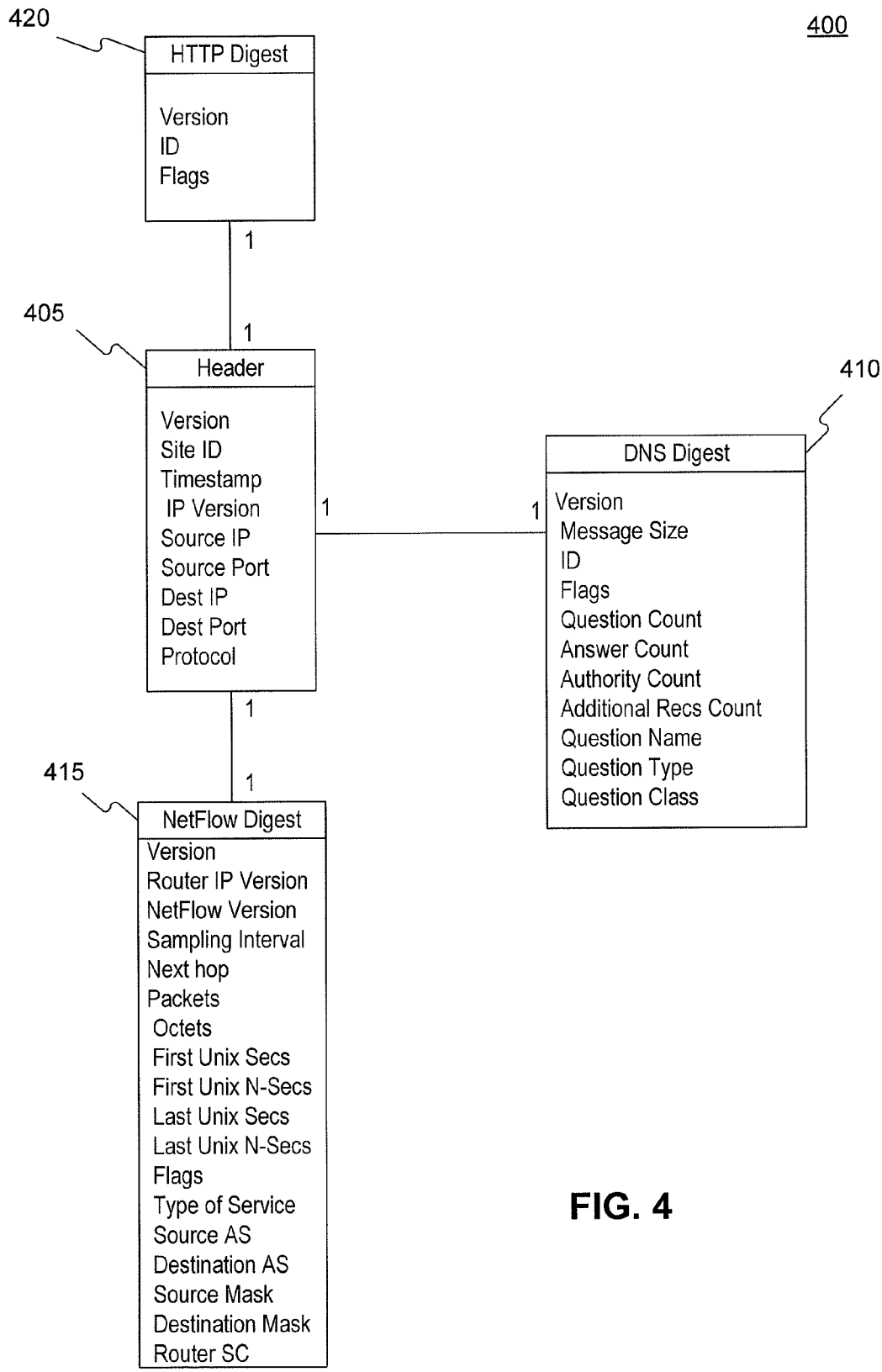
FIG. 4 is a diagram illustrating an exemplary data dictionary storing network traffic data from network traffic logs, consistent with disclosed embodiments.

FIG. 4 is a diagram illustrating an exemplary data dictionary 400 storing network traffic data from network traffic logs, consistent with disclosed embodiments. Central repository server 120 may create the records of data dictionary 400 after extracting data from network log files, such as PCAP files. Although the discussion below indicates central repository server 120 creates the records of data dictionary 400, in alternative embodiments name server 140 or network server 150 may create these records and transmit the records to central repository server 120.

For each network request, e.g. a DNS request, central repository server 120 may create header record 405. The header portion of a header/digest pair may include the data shown as part of header record 405. Header record 405 may include a version number that represents an internal version number of the data dictionary. The version number may enable changes to be made to the layout of the records in data dictionary 400 while still maintaining backwards compatibility. Header record 405 may also include an identifier for the site at which the network request was recorded. The site ID may identify a particular name server 140 or network server 150. Header record 405 may also include a timestamp indicating the date and/or time when the network request was logged and the IP version (either "4" or "6") of the request. Header record 405 may also include the source IP address and port of the computer where the network request originated. Header record 405 may also include the destination IP address and port and the protocol number of the request. The protocol number may be a numeric representation of the Internet protocol of the request (e.g. 6 for transmission control protocol (TCP) and 17 for user datagram protocol (UDP)). The information included in header record 405 may be common to all types of network traffic.

If the network traffic data that central repository server 120 extracts from one or more PCAP files is a DNS packet request, central repository server 120 may create DNS digest 410 in addition to header 405. For DNS requests, the digest portion of a header/digest pair may include the data shown in digest 410. DNS Digest may also include a version number that represents an internal version number of the data dictionary. DNS digest 410 may also include data fields specific to a DNS request. For example, DNS digest 410 may include a message size that represents the size in bytes of the DNS portion of the message. DNS digest 410 may also include an ID populated from the DNS header of the DNS request and flag words from the DNS header. Data from the DNS header may also supply central repository server 120 with a question count, answer count, authority count, and additional records count, which central repository server 120 may store in DNS digest 410. DNS digest 410 may also include a question name, which represents the question asked by the packet, a question type, and a question class. Central repository server 120 may extract these data fields from the DNS packet request.

If the network traffic data that central repository server 120 extracts from one or more PCAP files is a NetFlow™ request, central repository server 120 may create NetFlow digest 415 in addition to header 405. For NetFlow requests, the digest portion of a header/digest pair may include the data shown in digest 415. Like header 405 and DNS digest 410, NetFlow digest 415 may include a data dictionary version number. In addition, NetFlow digest 415 may include the IP version of the router IP address, the NetFlow export format version, the sampling interval field from the NetFlow header, the IP address of the next hop of flow, the number of packets in the flow, and the total count of layer 3 octets in the flow. NetFlow digest 415 may also include Unix seconds of the first packet in the flow, the residual nanoseconds of the first packet time, Unix seconds of the last packet in the flow, and the residual nanoseconds of the last packet time. NetFlow digest 415 may further include the cumulative OR of TCP flags and the IP type-of-service flow as well as the autonomous system number (ASN) of the source and the ASN of the destination. NetFlow digest 415 may additionally include the source address prefix mask bits, and the NetFlow version 7 flags indicating which flows are invalid, and the NetFlow version 7 IP of the router bypassed by Catalyst 5000.

In some embodiments, central repository server 120 may process HTTP request log records, creating HTTP digest 420. For HTTP requests, the digest portion of a header/digest pair may include the data shown in digest 420. HTTP digest 420 may include a data dictionary version number and other fields captured from the HTTP log record. Central repository server 120 may also create other types of digests for other network traffic log files. The records stored in data dictionary 400 may be used by programs or queries for data mining and to identify important trends across many network servers.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method for collecting network traffic data, comprising:
   obtaining, by a network site remote from a central repository, one or more packet capture (PCAP) files;
   extracting, by the network site, data from the one or more PCAP files, wherein the data includes header data and digest data;
   storing, by the network site, the header data and the digest data in a header/digest pair; and
   transmitting the header/digest pair to the central repository.

2. The method of claim 1, wherein transmitting the header/digest pair further comprises:
   receiving a request for one or more header/digest pairs; and
   transmitting, in response to the request, the one or more header/digest pairs to the central repository.

3. The method of claim 1, wherein extracting data from the one or more PCAP files further comprises:
   reconstructing a network request from the one or more PCAP files; and
   extracting the data from the network request.

4. The method of claim 3, wherein the network request includes a Domain Name System request.

5. The method of claim 1, wherein extracting data from the one or more PCAP files further comprises:
   reconstructing a network record from the one or more PCAP files; and
   extracting the data from the network record.

6. The method of claim 5, wherein the network record includes a NetFlow record.

7. The method of claim 1, wherein the network site includes at least one of a name server or a network router.

8. The method of claim 1, wherein the network site is one of a plurality of network sites communicatively coupled to the central repository.

9. The method of claim 1, wherein the header data includes at least one of an identifier of the network site, a timestamp, a source Internet Protocol (IP) address, a source port number, a destination IP address, or a destination port number.

10. A system for collecting network traffic data, comprising:
a processor at a network site remote from a central repository; and
a memory coupled to the processor, the memory storing instructions to direct the processor to perform operations comprising:
obtaining, by the network site, one or more packet capture (PCAP) files;
extracting, by the network site, data from the one or more PCAP files, wherein the data includes header data and digest data;
storing, by the network site, the header data and the digest data in a header/digest pair; and
transmitting the header/digest pair to the central repository.

11. The system of claim 10, wherein the processor performs the transmitting by:
receiving a request for one or more header/digest pairs; and
transmitting, in response to the request, the one or more header/digest pairs to the central repository.

12. The system of claim 10, wherein the processor performs the extracting by:
reconstructing a network request from the one or more PCAP files; and
extracting the data from the network request.

13. The system of claim 12, wherein the network request includes a Domain Name System request.

14. The system of claim 10, wherein the processor performs the extracting by:
reconstructing a network record from the one or more PCAP files; and
extracting the data from the network record.

15. The system of claim 14, wherein the network request includes a NetFlow record.

16. The system of claim 10, wherein the network site includes at least one of a name server or a network router.

17. The system of claim 10, wherein the network site is one of a plurality of network sites communicatively coupled to the central repository.

18. The system of claim 10, wherein the header data includes at least one of an identifier of the network site, a timestamp, a source Internet Protocol (IP) address, a source port number, a destination IP address, or a destination port number.

19. A computer-readable storage device storing instructions for collecting network traffic data, the instructions causing one or more computer processors at a network site remote from a central repository to perform operations, comprising:
obtaining, by the network site, one or more packet capture (PCAP) files;
extracting, by the network site, data from the one or more PCAP files, wherein the data includes header data and digest data;
storing, by the network site, the header data and the digest data in a header/digest pair; and
transmitting the header/digest pair to the central repository.

20. The computer-readable storage device of claim 19, wherein the one or more computer processors perform the extracting by:
reconstructing a network request from the one or more PCAP files; and
extracting the data from the network request.

* * * * *